US007877367B2

(12) United States Patent
Ross et al.

(10) Patent No.: US 7,877,367 B2
(45) Date of Patent: Jan. 25, 2011

(54) COMPUTER METHOD AND APPARATUS FOR GRAPHICAL INQUIRY SPECIFICATION WITH PROGRESSIVE SUMMARY

(75) Inventors: Steven I. Ross, South Hamilton, MA (US); Nishanth R. Sastry, Cambridge, MA (US); Daniel M. Gruen, Newton, MA (US); Susanne C. Hupfer, Lexington, MA (US); John F. Patterson, Carlisle, MA (US); James E. Christensen, Cortlandt Manor, NY (US); Stephen E. Levy, Honolulu, HI (US)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 12/017,987

(22) Filed: Jan. 22, 2008

(65) Prior Publication Data

US 2009/0187556 A1    Jul. 23, 2009

(51) Int. Cl.
G06F 7/00       (2006.01)
G06F 17/30      (2006.01)
G06F 3/00       (2006.01)
G06F 3/048      (2006.01)

(52) U.S. Cl. .................. 707/705; 707/708; 715/700; 715/772

(58) Field of Classification Search .......... 707/999.004, 707/999.005, 999.006, 705, 706, 708, 999.003; 715/700, 772
See application file for complete search history.

(56) References Cited

U.S. PATENT DOCUMENTS 5,943,497 A     8/1999  Bohrer et al.
6,023,578 A *   2/2000  Birsan et al. ............... 717/105
6,108,635 A *   8/2000  Herren et al. ................. 705/2
6,208,985 B1    3/2001  Krehel
6,609,132 B1*   8/2003  White et al. ........... 707/999.103
6,691,134 B1    2/2004  Babula et al.
7,130,861 B2   10/2006  Bookman et al.
7,139,774 B2   11/2006  Dettinger et al.
7,143,091 B2* 11/2006  Charnock et al. ..... 707/999.005
7,240,330 B2*  7/2007  Fairweather .............. 717/116
7,428,555 B2*  9/2008  Yan ...................... 707/999.104
7,707,159 B2   4/2010  Christianson et al.
2002/0059069 A1  5/2002 Hsu et al.
2003/0101151 A1  5/2003 Holland (Continued)

OTHER PUBLICATIONS

Chang, N-S., et al. "Query-by-Pictorial-Example", IEEE Trans. on Software Eng, vol. SE-6, No. 6, Nov. 1980, pp. 519-525.

(Continued)

Primary Examiner—Vincent Boccio
(74) Attorney, Agent, or Firm—Hamilton, Brook, Smith & Reynolds, P.C.

(57) ABSTRACT

A computer method and system provides for graphical specification of inquiries and includes a corresponding progressive summary. The inquiries operate on stream data. Users graphically specify an inquiry in a graphical user interface according to an ontology. The invention system generates a plain-text translation of the graphical description of the inquiry and displays the generated plain-text description in a progressive summary in the graphical user interface. The system continually updates and generates the display of the plain-text description during user construction of the inquiry. This provides feedback to the user for improved construction of the inquiry.

20 Claims, 11 Drawing Sheets

U.S. PATENT DOCUMENTS

| | | |
|---|---|---|
| 2004/0139107 A1 | 7/2004 | Bachman et al. |
| 2004/0220893 A1 | 11/2004 | Spivack et al. |
| 2007/0088723 A1 | 4/2007 | Fish |
| 2008/0162498 A1 | 7/2008 | Omoigui |
| 2009/0158099 A1 | 6/2009 | Cui |
| 2009/0248753 A1 | 10/2009 | Tsai et al. |

OTHER PUBLICATIONS

Fadhil, A., et al. GLOO: A Graphical Query Language for OWL ontologies. OWL: Experience and Directions 2006, Athens, 2006.

Harth, A., "Graphical Representation of RDF Queries,"[online] 2006 [retrieved on Jan. 1, 2008]. Retrieved from the Internet URL: http://www2006.org/programme/files/xhtml/p149-harth.html.

Joseph, T. et al. "PICQUERY: A High Level Query Language for Pictorial Database Management", IEEE Transactions on Software Engineering, v.14 n.5, p. 630-638, May 1988.

Zloof, M.M., "Query-by-Example: A Database Language," IBM Systems Journal, vol. 21, No. 3, 1977, pp. 324-343.

* cited by examiner

COMPUTER METHOD AND APPARATUS FOR GRAPHICAL INQUIRY SPECIFICATION WITH PROGRESSIVE SUMMARY

GOVERNMENT SUPPORT

This invention was made with government support under Contract No. TIA H98230-05-3-0001 awarded by the U.S. Department of Defense. The Government has certain rights to this invention.

BACKGROUND OF THE INVENTION

Complex tasks such as Investigative Analysis and Business Intelligence gathering require the construction of high-level semantic inquiries, such as "Monitor all calls made by customers to a customer service rep". However, the specification of the inquiries using a language such as the IBM Research's Inquiry Specification Language (ISL) or the closely related SPARQL language (part of w3c's semantic web stack of standards) is a low-level task. This mismatch—having to attend to the low-level task of query creation while engaged in the high level task of modeling—creates a severe disruption in the workflow of modelers.

The specification of a database (DB) query using graphical techniques and the characterization of the desired query results are not novel ideas. Existing work on queries on relational and other traditional databases show both of these techniques. Well-known examples include:

M. M. Zloof, "Query-by-Example: A Database Language," IBM Systems Journal, Vol. 21, No. 3, 1977, pp. 324-343.

T. Joseph, A. F. Cardenas, PICQUERY: A High Level Query Language for Pictorial Database Management, IEEE Transactions on Software Engineering, v. 14 n. 5, p. 630-638, May 1988 [doi>10.1109/32.6140]

N.-S. Chang and K.-S. Fu, "Query-by-Pictorial-Example", IEEE Trans. on Software Eng, Vol. SE-6, No. 6, November 1980, pp. 519-525.

Using a graph to specify a query for a knowledgebase (KB) is also not novel. Prior art includes: A. Fadhil and V. Haarslev, GLOO: A Graphical Query Language for OWL ontologies. OWL: Experience and Directions 2006, Athens, 2006.

SUMMARY OF THE INVENTION

Applicant's solution allows the construction of complex queries by creating a graphical model describing the attributes of the desired result. The present invention also simultaneously provides a textual feedback of the query being constructed through a natural language progressive summary. Together, the graphical and textual panes make it easy for the modeler to specify the query as well as the result items that the query needs to produce.

The present invention further simplifies the construction of the query by drawing relevant information from the context of the model into the inquiry being posed. Preferably, the inquiries being defined are in effect standing queries against streaming data. They are monitoring and searching the streaming data for situations that match their specification, and returning the cases that are found as results. The inquiry specifications are essentially semantic descriptions of the results that the inquiry is looking for.

In a preferred embodiment, a computer implemented method or system specifies queries for monitoring or otherwise inquiring streaming data by:

receiving user input graphically specifying a query in a graphical user interface;

utilizing an ontology, generating a plain-text description of the query; and in the graphical user interface, displaying the generated plain-text description in a progressive summary during user construction of the query through the graphical user interface.

A natural-language unit continually generates and updates the plain-text description during user construction of the query. This forms or otherwise supports the progressive summary. In some embodiments, the natural language unit generates a plain-text translation of the graphical description and specification of the inquiry.

According to one aspect of the present invention, the plain-text description serves as a feedback loop to the user for reviewing construction of the query.

According to another feature of the present invention the definition of the inquiry is carried out in the context of another model and can incorporate parts of the other model in the query specification. The ontology is common across the models.

In accordance with another aspect of the present invention, the specified queries are applied against, effectively monitor or otherwise operate on streaming data. The streaming data has limited structure relative to databases and knowledge-bases.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Briefly the present invention is different from prior art in the following ways:

1. The invention is a means of specifying queries which operate on streams of data 47 (FIG. 11) that have limited structure as compared to traditional databases or knowledge-bases (each of which have well-defined structure). These data streams 47 are not contained in a DB (database, as for the systems querying relational DB described above), nor are they contained in a KB (knowledgebase, as for the GLOO approach described above).

2. The invention relies on an ontology 53 (FIG. 11) to formally describe the data and the relationships among the data in the problem domain. In comparison, relational DB provides schemas with data types, and some constraints on the content. Furthermore, the ontology 53 is used by the present invention to help users construct queries (for example, by presenting the attributes of the classes of the elements involved in the query).

Figure 8:
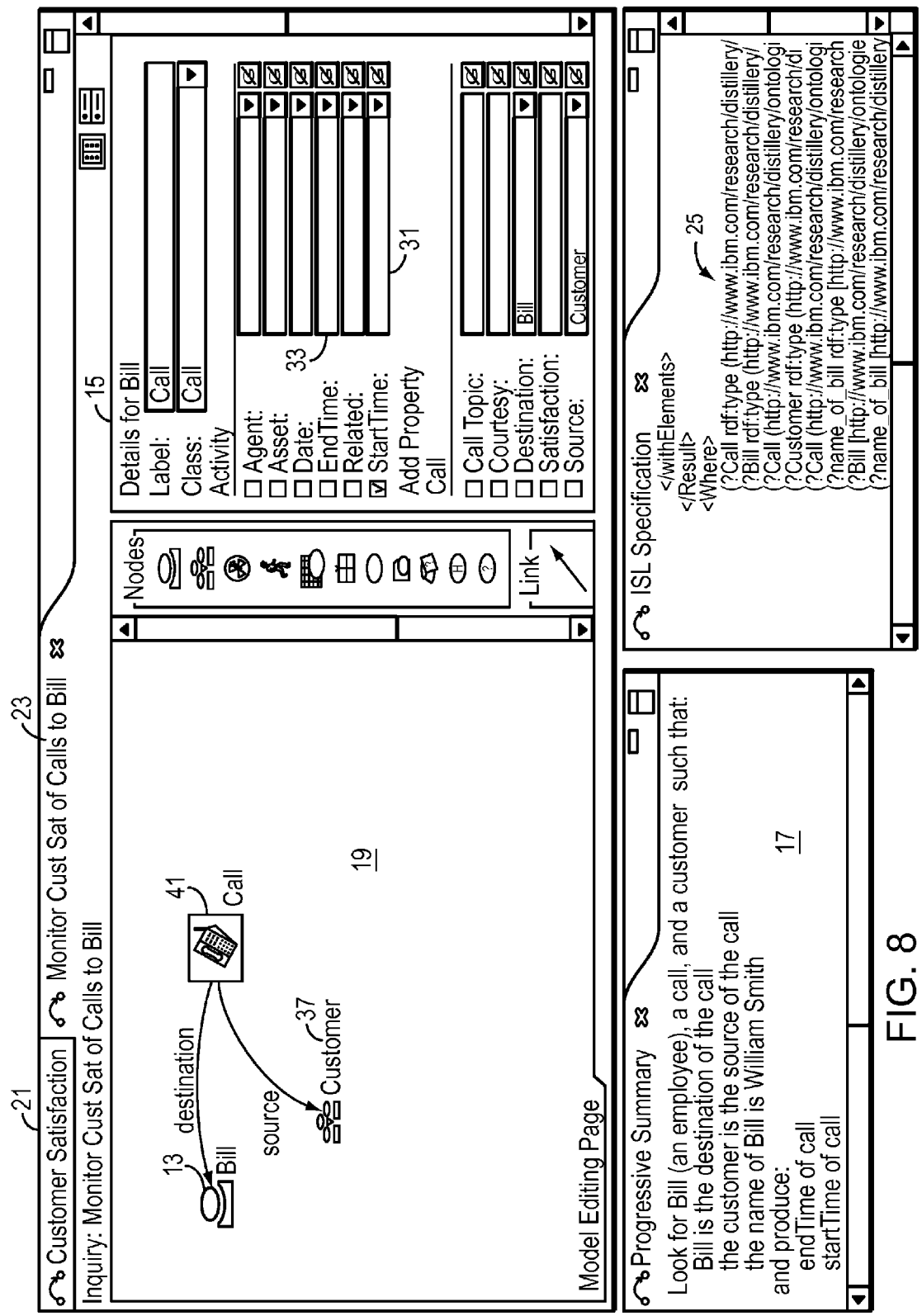
Figure 11:
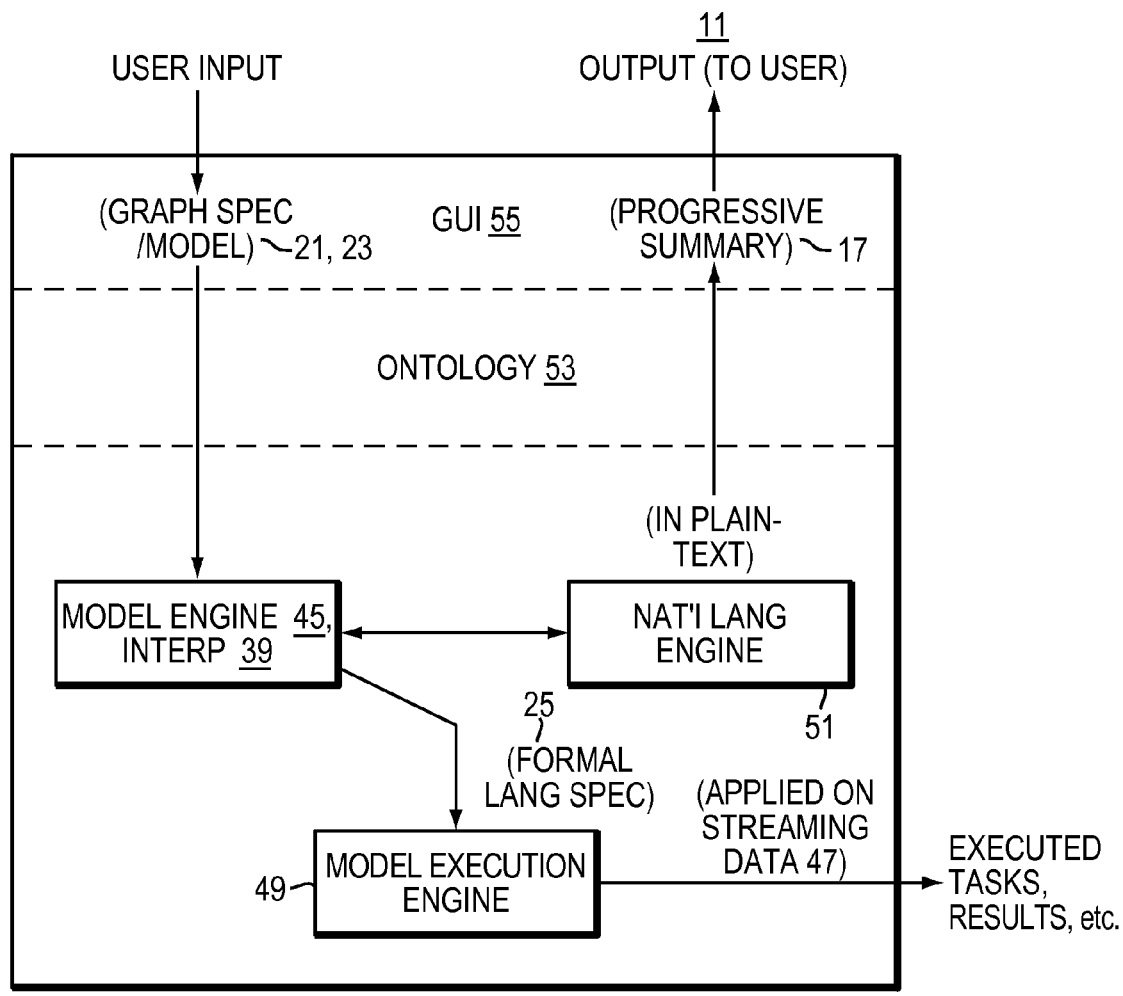
FIG. 11 is a block diagram of one embodiment of the present invention.

3. As a query is being constructed, the invention system 11 (FIG. 11) supplements the graphical specification 23 with a plain-text description 17 (FIGS. 8 and 11). The textual description 17 serves as a feedback loop that helps users see mistakes in the specification 23 quickly (before spending the time to submit and evaluate the query).

4. The model of the inquiry 23 can be embedded in a larger model 21 of the problem domain. The relationships of the elements in the inquiry to other elements in the larger model 21 can be used to specify a more accurate (detailed) definition of the query elements (for example, to gather other identifying attributes of the subjects of the query, such as credentials used to identify people).

It is the combination of these elements, as further described below, that differentiates the present invention from prior art, and allows users to construct complex queries/inquiries on a diverse set of data sources. Accordingly the present invention presents advantages for industries/sectors that reason about information, competitive analysis, Homeland Security, law enforcement, business intelligence, etc. Embodiments of the present invention may be included in database or knowledgebase products. Other product combinations are suitable.

Figure 1:
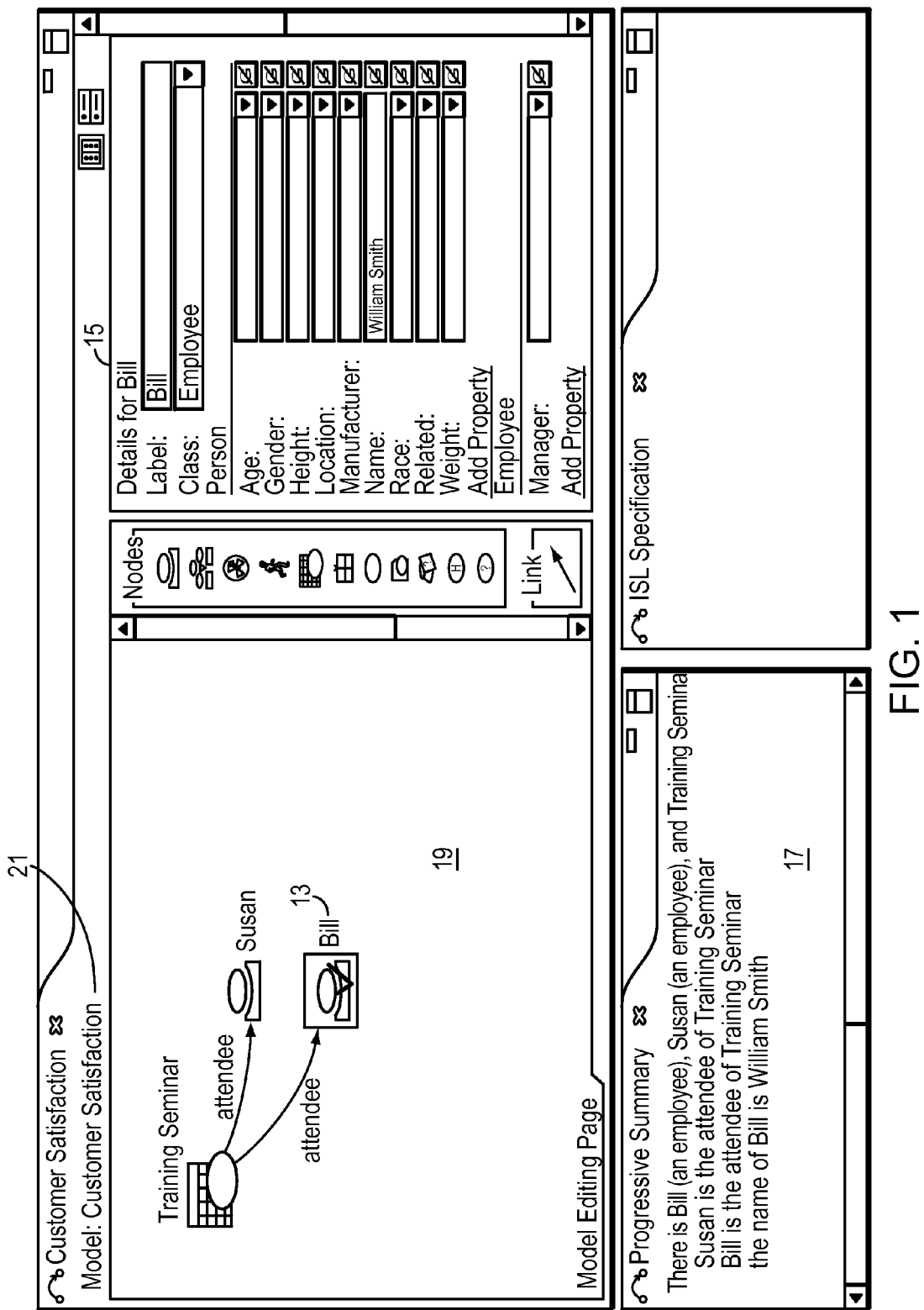
FIG. 1 is a schematic illustration of a screen view of a subject model (e.g. training seminar).

The present invention is next described through a non-limiting highly simplified example scenario of modelling attendees at a customer satisfaction seminar. The screen shot in FIG. 1 shows a graphical representation of a "Customer Satisfaction" model 21. The illustrated model 21 has a training seminar graphically indicated. The user has selected the modelled entity 13 labelled "Bill". The modeller has entered some information about the entity Bill 13. For instance, notice the details pane 15 on the right has the name "William Smith" and the progressive summary pane 17 at the bottom contains the sentence: "the name of Bill is WIlliam Smith".

Figure 2:
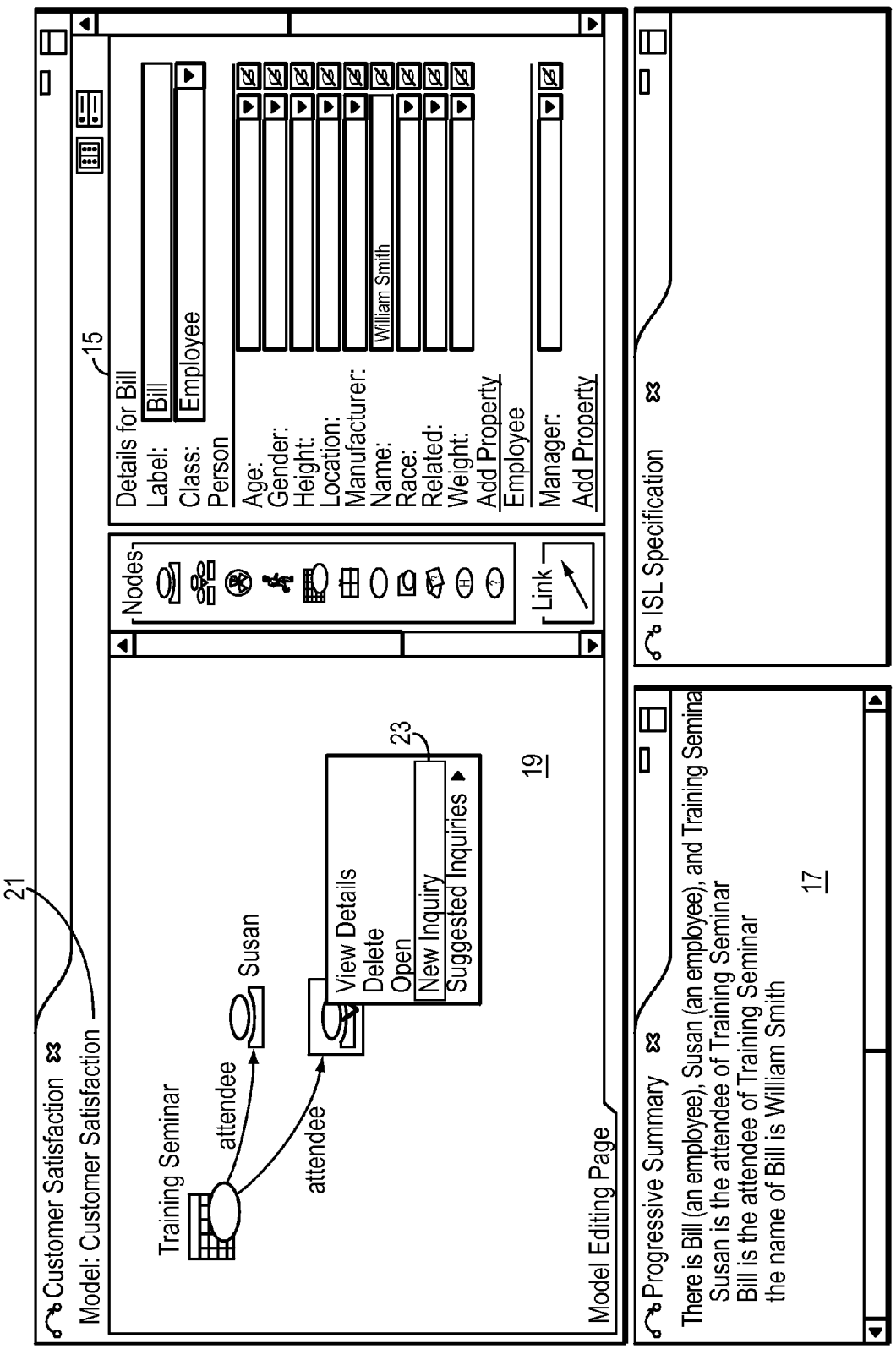
FIGS. 2 and 3 are schematic illustrations of screen views posing an inquiry in the context of the host model of FIG. 1 in accordance with the present invention.

The modeller now wants to monitor the customer satisfaction of calls routed to Bill by studying the start and end times of each call. This is done by posing an inquiry 23 within the context of the model 21 as illustrated in FIG. 2.

Figure 3:
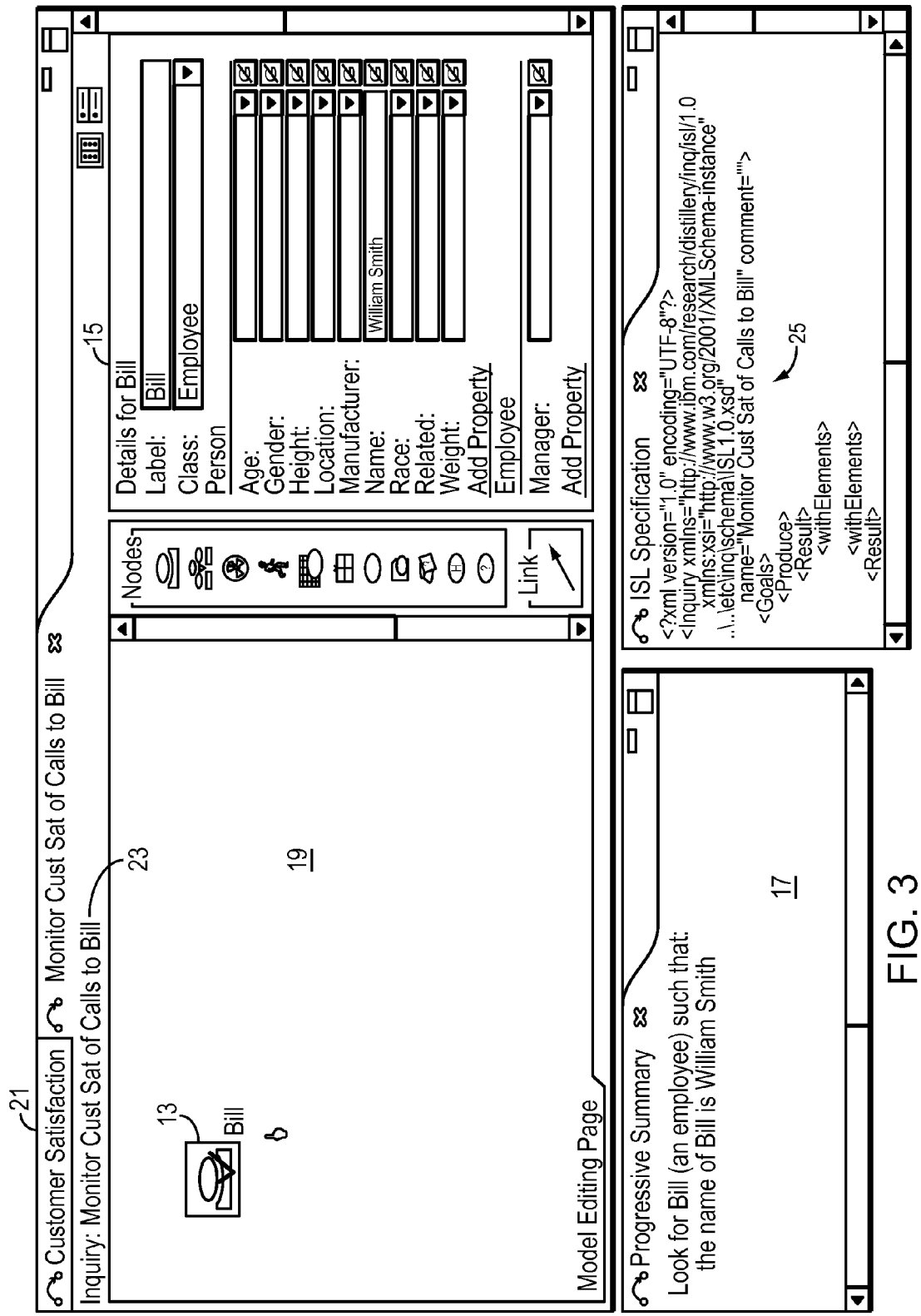

Posing the query 23 from the context of the model 21 allows the invention system 11 to draw already known or modeled information about the entity Bill 13 into the inquiry 23. In the screenshot in FIG. 3, notice that Bill's name, "William Smith", has already been automatically filled into the details pane 15 on the right hand side and also appears automatically in the progressive summary 17 at the bottom. Also notice that the graphical pane 19 used to model the inquiry 23 looks very similar to the screen view in FIG. 1 where the training seminar 21 was being modelled.

Figure 4:
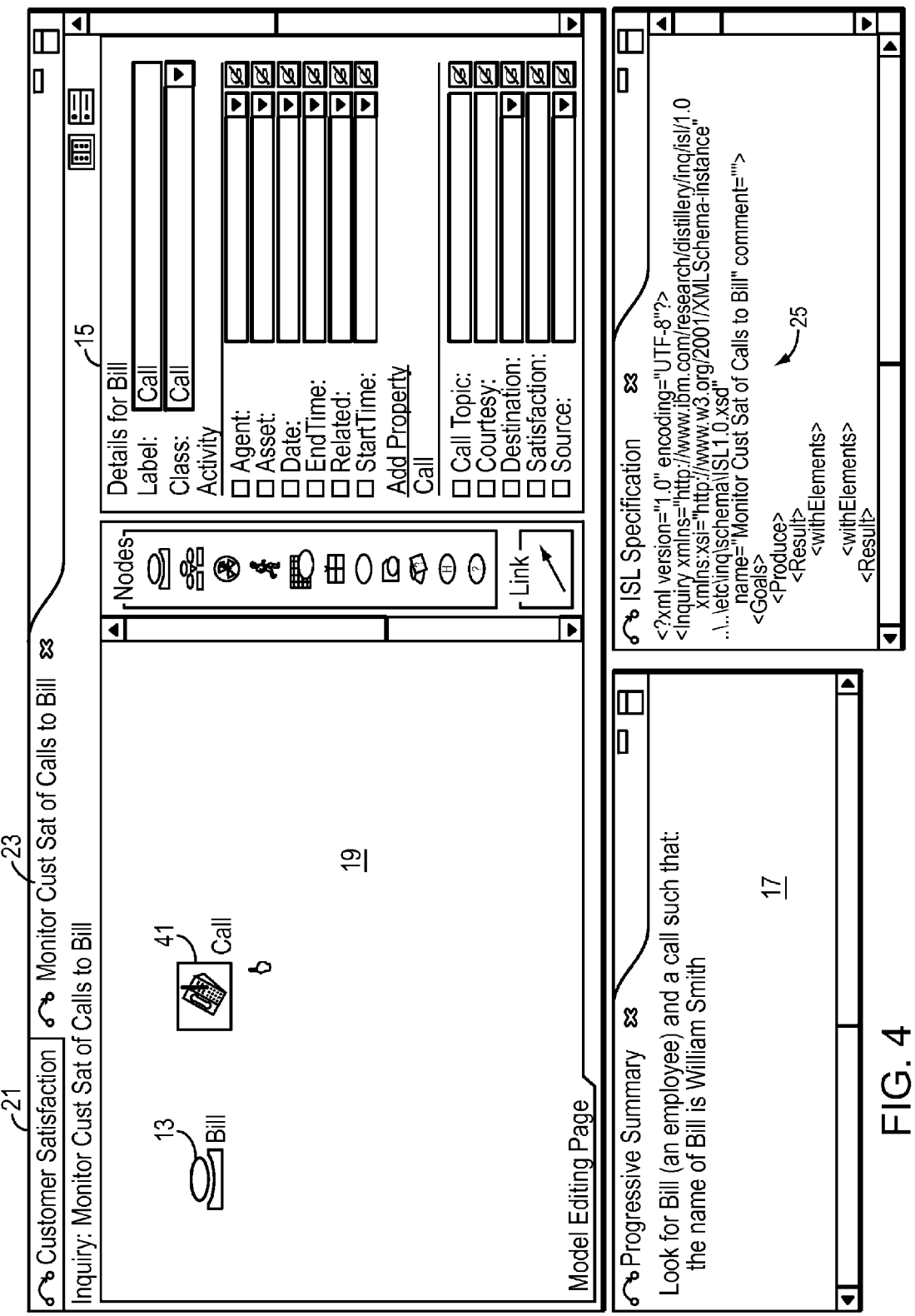
FIG. 4 is a schematic illustration of a screen view creating a call object in a step of the present invention.

The details of the inquiry 23 are entered in the same or similar manner as creating a model 21 of the situation being inquired about. The next three screenshots (FIGS. 4-6) illustrate the steps required to model the fact that the results the modeler-user wants to examine are calls whose destination is Bill (modeled entity 13).

Step 1 of 3: A call object 41 is created in FIG. 4. This is supported by the object creation function/operations of host modelling system 21.

Figure 5:
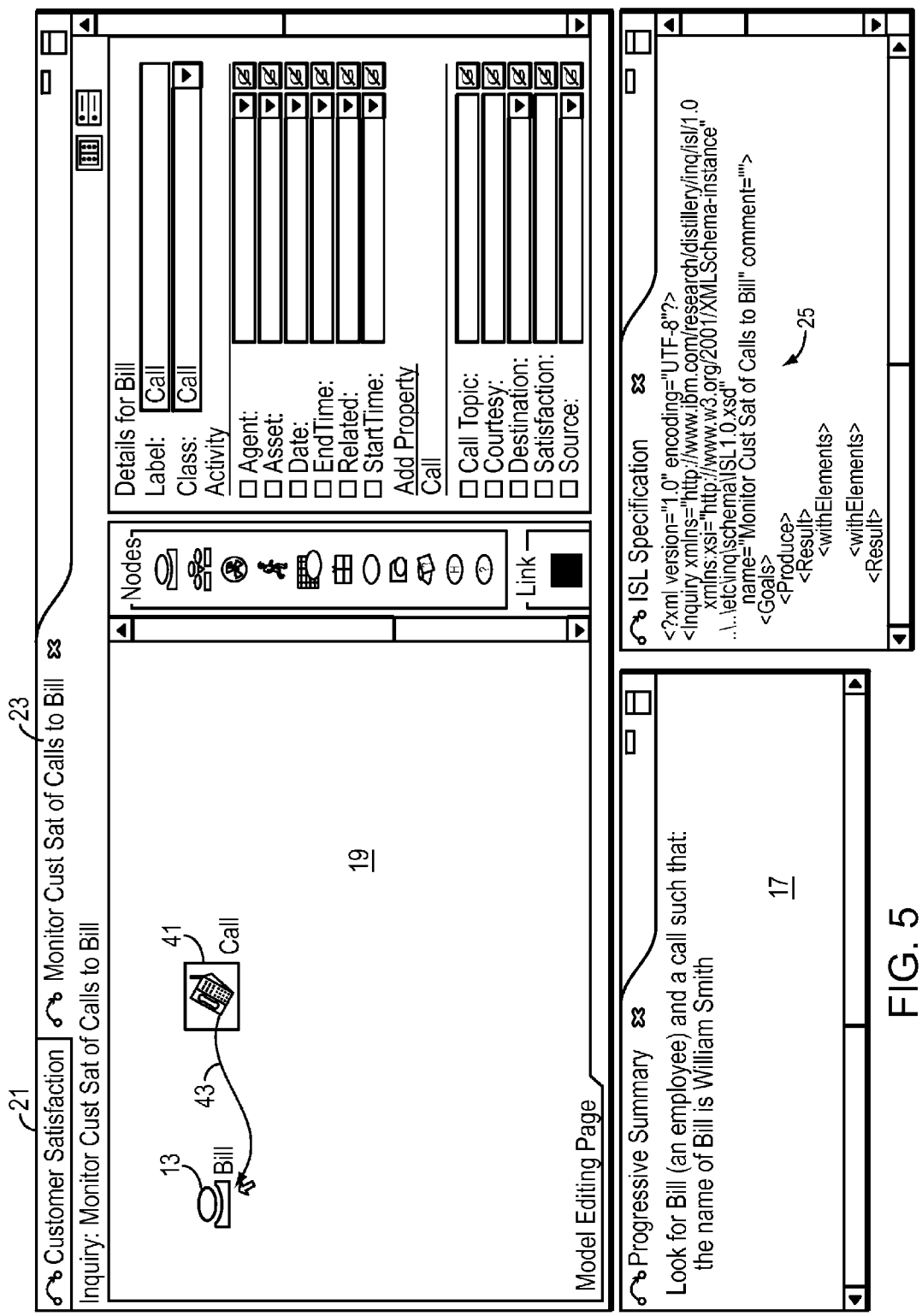
FIG. 5 is a schematic illustration of a screen view specifying a relation between the call object of FIG. 4 and a model entity of the present invention.

Step 2 of 3: A relation 43 is specified between the call 41 and Bill 13 elements by graphically drawing an arrow as illustrated in FIG. 5. This is supported by the relation function/operation of host modelling system 21.

Figure 6:
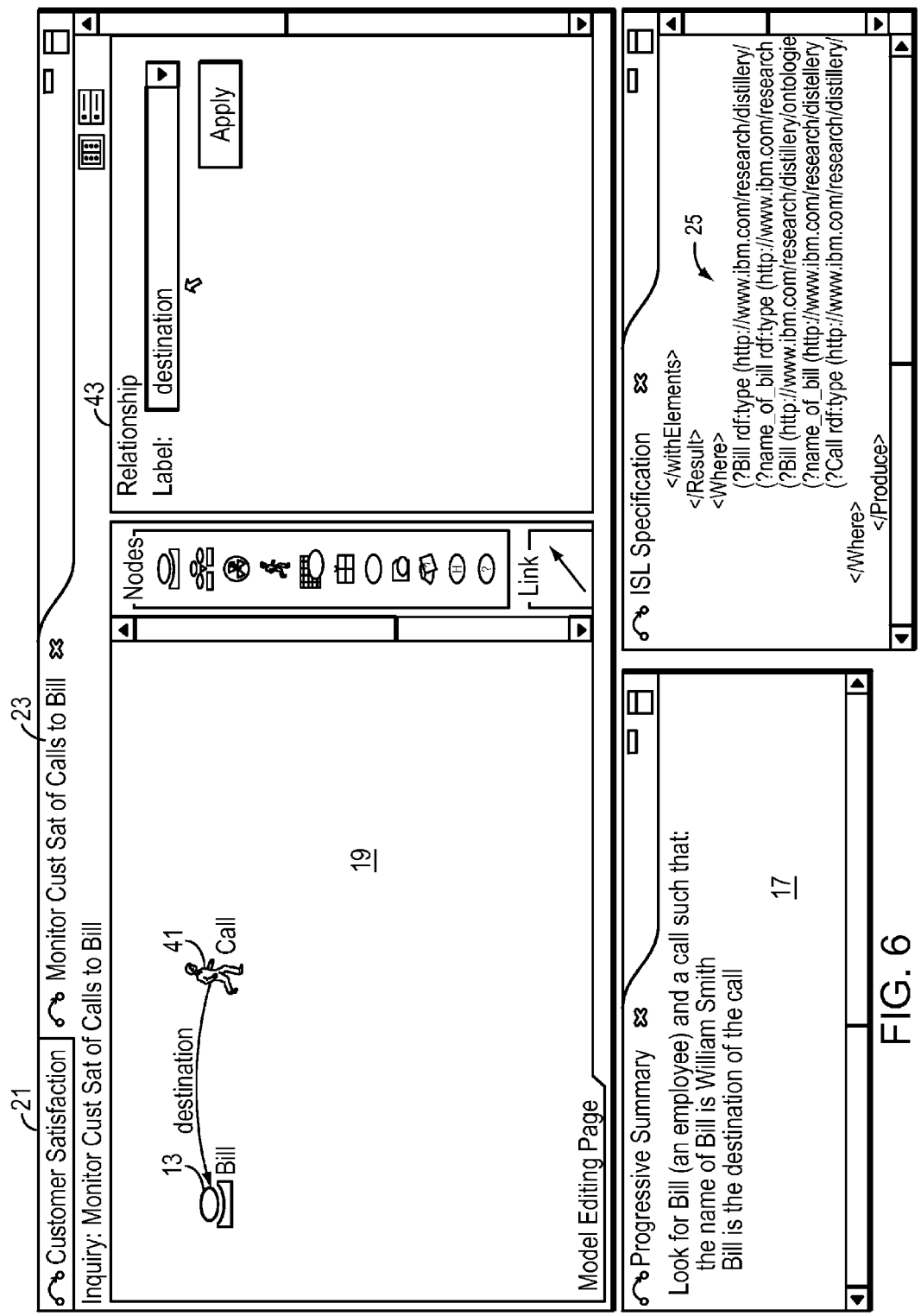
FIG. 6 is a schematic illustration of a screen view for editing the relation specified in FIG. 5 according to the present invention.

Step 3 of 3: In FIG. 6, the relation 43 specified in FIG. 5 is further clarified by editing the nature of the relationship (i.e., that Bill 13 is the destination of the call 41). Notice on the bottom right of the figure that the graphical model 23 is being translated into a formal Inquiry Specification Language 25 or ISL query (ISL is a query language based on SPARQL, which is part of the w3c stack of standards for the semantic web). Also the progressive summary 17 is updated to reflect the new statement that has been modelled in the inquiry 23.

Figure 7:
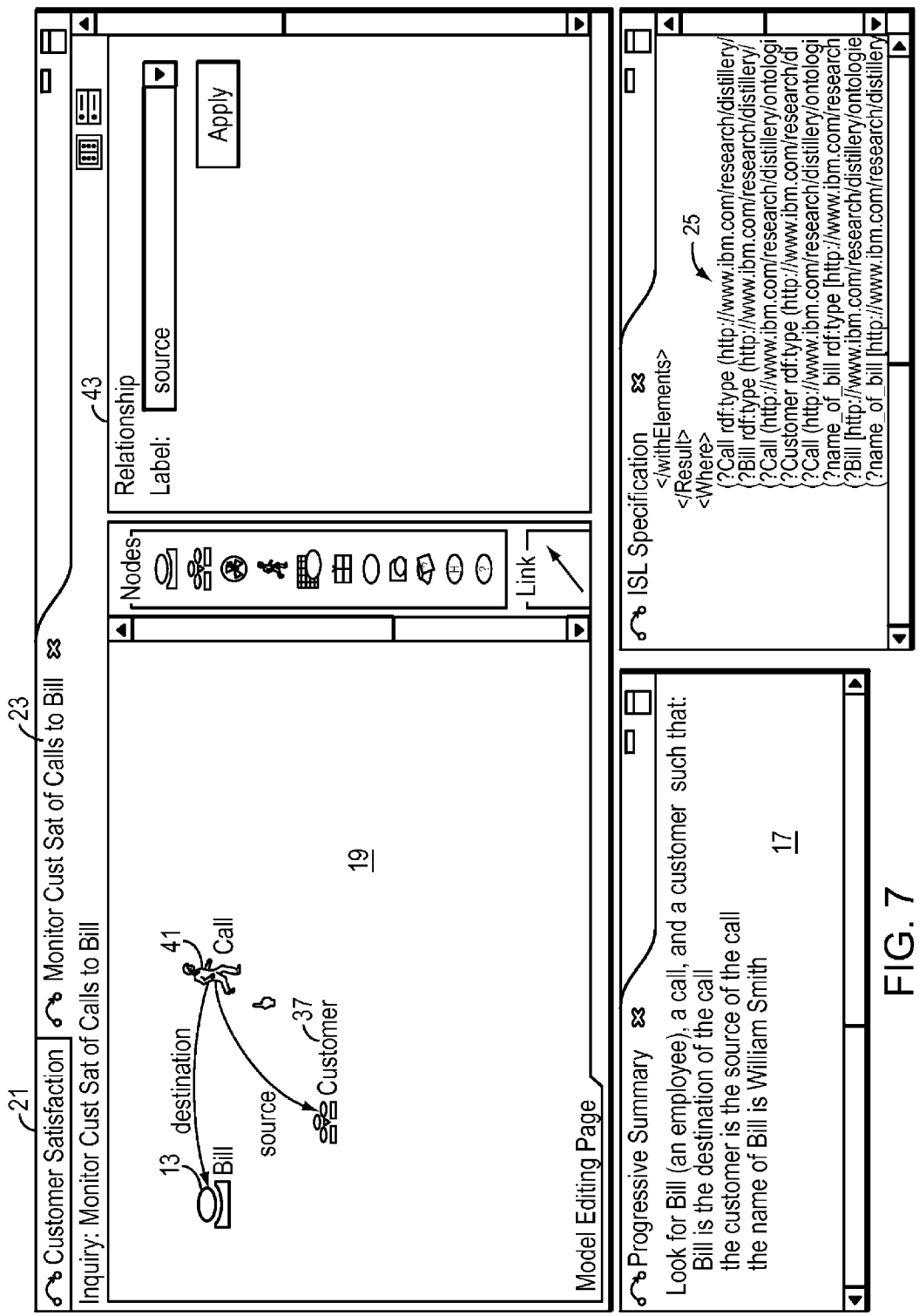
FIGS. 7 and 8 are schematic illustrations of screen views for specifying further details of the inquiry of FIGS. 2 and 3.

Other details of the inquiry 23 (that the call 41 has a source, who is a customer 37) are similarly specified, as shown in the screenshot of FIG. 7. Again host modelling system 21 functions and operations accomplish this specification of details.

Finally, the inquiry 23 needs to specify what aspects of the desired situation are of interest. In this case, the user checks off the startTime 31 and endTime 33 properties of the call object 41 as shown in FIG. 8. The progressive summary 17 and ISL 25 views are also updated.

The final progressive summary 17 looks as follows. The goal is to have it be as close to natural language as possible. The text is generated by choosing and applying a natural language template appropriate to the type of claim being translated.

Example Progressive Summary 17

---

Look for Bill (an employee), a call, and a customer such that:
  Bill is the destination of the call
  the customer is the source of the call
  the name of Bill is William Smith
and produce:
  endTime of call
  startTime of call

---

To appreciate the difference between the high-level (graphical model) inquiry specification 23 and the low-level (formal language-type specification) inquiry of 25, the section below shows the above example inquiry 23 translated into Inquiry Specification Language for the inquiry (model execution) engine 49 to consume.

---

```
<?xml version="1.0" encoding="UTF-8"?>
<Inquiry xmlns="http://www.ibm.com/research/distillery/inq/isl/1.0"
xmlns:xsi="http://www.w3.org/2001/XMLSchema-instance"
xsi:schemaLocation="http://www.ibm.com/research/distillery/inq/isl/1.0
..\..\etc\inq\schema\ISL1.0.xsd"
        name="Monitor Cust Sat of Calls to Bill" comment="">
    <Goals>
        <Produce>
            <Result>
                <withElements>
                    <ResultElement>?Call</ResultElement>
                </withElements>
            </Result>
            <Where>
                (?Call rdf:type
    [http://www.ibm.com/research/distillery/ontologies/domains/
DIG_Simplified/definitions.owl#EmployeePersonContact])
                (?Bill rdf:type
[http://www.ibm.com/research/distillery/ontologies/domains/
DIG_Simplified/definitions.owl#EmployeeParticipant])
                (?Call
[http://www.ibm.com/research/distillery/ontologies/domains/
DIG_Simplified/definitions.owl#hasParticipant] ?Bill)
```

-continued

```
            (?Customer rdf:type
[http://www.ibm.com/research/distillery/ontologies/domains/
DIG_Simplified/definitions.owl#CustomerParticipant])
            (?Call
[http://www.ibm.com/research/distillery/ontologies/domains/
DIG_Simplified/definitions.owl#hasParticipant] ?Customer)
            (?name_of_bill rdf:type
[http://www.ibm.com/research/distillery/ontologies/modelLibrary/
definitions.owl#PersonName])
            (?Bill
[http://www.ibm.com/research/distillery/ontologies/system/
core.owl#has Name]  ?name_of_bill)
            (?name_of_bill
[http://www.ibm.com/research/distillery/ontologies/modelLibrary/
definitions.owl#fullName] "William_Smith")
        </Where>
      </Produce>
    </Goals>
    <Constraints/>
    <OperationalParameters>
        <RiskMax>1000000</RiskMax>
        <ResourceUtilizationMax>500</ResourceUtilizationMax>
    </OperationalParameters>
</Inquiry>
```

Thus in the given example, the query 23 describes the characteristics of certain calls between customers and a particular employee to monitor for, and asks for the results to show the start and end times of these calls. The streaming data 47 (FIG. 11) may be data about all calls coming into the call center. Inquiry 23 when executed at 49 (FIG. 11) extracts from this data the calls to the particular employee that came from customers and returns as results a stream containing start and end times for just the calls to the specified employee that came from customers.

Accordingly, one embodiment (system/method 11) is formed of a model engine 45, natural language engine or unit 51 and execution engine 49 as illustrated in FIG. 11. The model engine 45 enables creation and definition of elements of a subject model. Creation and definition is by graphical specification (via graphical user interface GUI 55) based on ontology 53. The ontology 53 in some embodiments is predetermined, but various ontologies 53 are suitable. In a preferred embodiment, ontology 53 evolves over time as described in U.S. patent application Ser. No. 11/867,890 entitled "A Method And Apparatus For Providing On-Demand Ontology Creation and Extension," filed on Oct. 5, 2007 and herein incorporated by reference.

An ontology is like a structured vocabulary, providing a set of classes that the entities discussed might belong to, a set of attributes that members of particular classes might have, and relationships that could hold between members of various classes. The models 21, 23 are particular applications of this vocabulary, specifying a set of entities that are members of one or more of these classes, and assertions about values for attributes of these entities and relationships that hold between these entities. The graphical and textual specifications are different ways of representing each model 21, 23. In the graphical specification of a model, entities are the nodes, relationships are the arcs, and the attributes are shown in the details pane. In the progressive summary 17 of a model, the same information is shown in a controlled natural language form. The ontology 53 serves as a common vocabulary in which all the models 21, 23 on a particular instance of the system 11 are expressed.

In the example, the first user input generates a graphical specification of training seminar model 21. Model engine 45 enables relating and interoperating or other configuration of cooperation between two or more elements of model 21. Further model engine 45 auto fills (or otherwise completes/specifies) fields/parameter values in GUI details pane 15 for attributes (e.g., person name) that repeat from one screen view to another within a given model and across models 21, 23. This assists the user with further model specification in an automated manner.

The results produced by model engine 45 include a graphical model specification 21 of the subject model and displayable at the GUI 55 level. A model interpreter 39 receives as input the graphical model specification 21 and generates the formal language-type (ISL) specification 25 of the subject model. Known or common techniques for implementing model engine 45 and model interpreter 39 are employed. The model (i.e. specification 25) of subject 21 is then executed or otherwise evaluated and processed by execution engine 49 using techniques common in the art. Preferably, execution 49 converts the ISL Specification 25 of queries 23 into a streaming query application made clearer next.

In addition to model 21, the present invention enables model engine 45 to specify (or model) inquiries/queries 23. This is accomplished using similar techniques of and in the domain or context (environment) of the subject model 21. Further the invention system 11 provides a progressive summary 17 which is a natural language (plain-text) version or translation of inquiry graphical specification 23 during user construction of the inquiry/query. This is accomplished using the natural language engine 51. The natural language engine 51 employs or otherwise utilizes ontology 53. As stated above, the ontology 53 describes what classes of objects exist, what attributes members of those classes may have and what relationships may exist between members of different classes. The query model 23 represents particular entities which are members of specific classes from the ontology and the asserted relationships from the ontology that exist between them. So each item (entity, relationship, etc.) represented by a respective graphical model element in query model 23 is recited in the progressive summary 17 as (i) being an instance of the class of the corresponding ontology definition and (ii) having the respective label (element name) indicated in the graphical model specification 23 and attributes (field values) indicated in the details pane 15.

Natural language unit 51 further orders the plain-text description parts according to the element relationships (e.g. target, source) and attributes (e.g. direction, start time, end-time . . . ) specified in the graphical model 23. Natural language unit 51 responds to each user addition and/or further definition of graphical model elements and relationships/configurations made in graphical specification 23 through GUI 55. In this way, natural language engine 51 continually generates and updates the plain-text description forming progressive summary 17 during user construction of the inquiry/query 23. System 11 input/output (I/O) displays the progressive summary 17 in a respective pane, work area, or the like in GUI 55.

Figure 9:
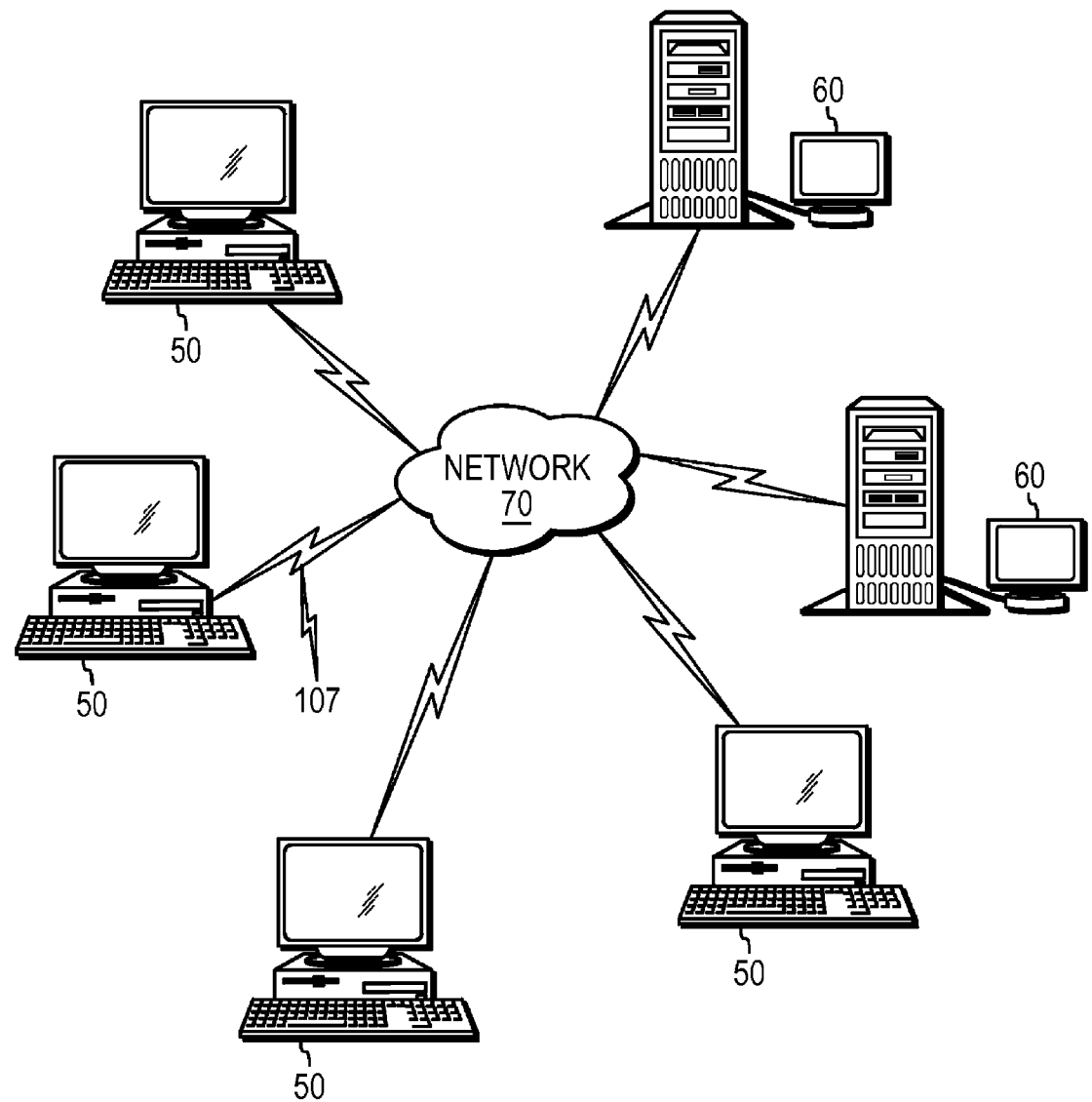
FIG. 9 is a schematic view of a computer network in which embodiments of the present invention are implemented.

FIG. 9 illustrates a computer network or similar digital processing environment in which embodiments of the present invention (such as system 11) may be implemented.

Client computer(s) 50 and server computer(s) 60 provide processing, storage, and input/output devices executing application programs and the like. Client computer(s) 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 10:
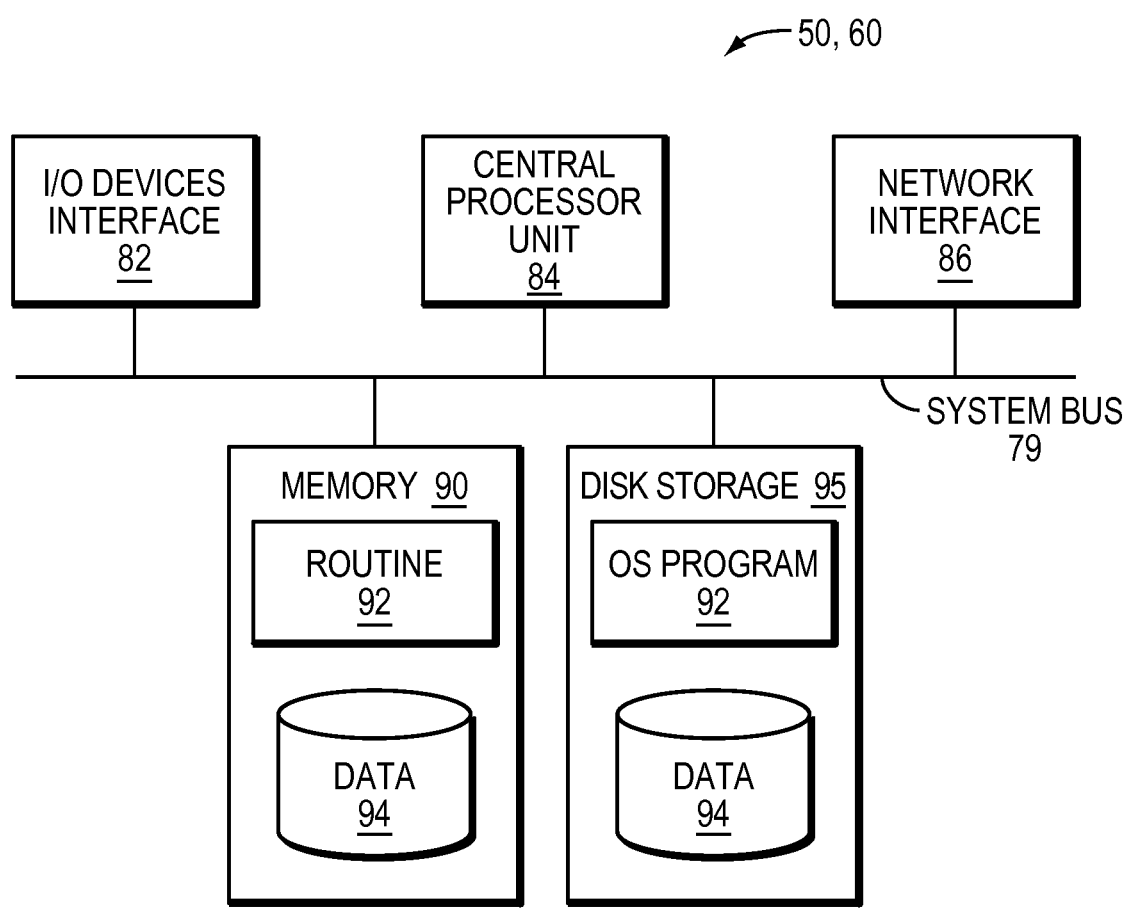
FIG. 10 is a block diagram of a computer node in the network of FIG. 9.

FIG. 10 is a diagram of the internal structure of a computer (e.g., client processor 50 or server computers 60) in the computer system of FIG. 9. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 9). Memory 90 provides volatile storage for computer software instructions 92 and data 94 used to implement an embodiment of the present invention (e.g., model engine/interpreter 45, 39, natural language engine 51, execution engine 49 and modeling method/system 11 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 9 and 10 are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

For additional details on ontology management/implementation see U.S. patent application Ser. No. 11/867,890, entitled "A Method And Apparatus For Providing On-Demand Ontology Creation and Extension," filed on Oct. 5, 2007 and herein incorporated by reference.

What is claimed is:

1. A computer implemented method of specifying queries comprising:

posing an inquiry within context of a given model by receiving user input graphically specifying a query in a graphical user interface, the query being the inquiry applied against streaming data, and the model graphically modeling entities and information including details of the inquiry;

utilizing an ontology and a natural language template respective to type of the inquiry in the model, during user construction of the query and outside of query execution generating a plain-text, natural language description of the query; and in the graphical user interface, displaying the generated plain-text, natural language description in a progressive summary, said displaying being during user construction of the query through the graphical user interface and before query execution, the generated plain-text, natural language description being different from graphical specification of the query.

2. The computer method as claimed in claim 1 wherein generating includes continually updating the plain-text description during user construction of the query.

3. The computer method as claimed in claim 1 wherein the plain-text description serves as a feedback loop to the user for reviewing construction of the query.

4. The computer method as claimed in claim 1 wherein the method is carried out in a context of another model, and the ontology is in common across models.

5. The computer method as claimed in claim 4 wherein parts of the another model are incorporated into specification of the query.

6. The computer method as claimed in claim 1 wherein the streaming data has limited structure relative to databases and knowledgebases.

7. Computer apparatus for graphical inquiry specification, comprising:
   a graphical user interface executed by a computer processor, the graphical user interface enabling posing of an inquiry in context of a given model by receiving user input graphically specifying the inquiry, the inquiry being operable on streams of data, wherein the model graphically models entities and information including details of the inquiry; and
   a natural language unit executed by a digital processor, the natural language unit being responsive to the user input and choosing a natural language template respective to type of the inquiry in the model, and the natural language unit utilizing an ontology and the chosen natural language template and generating a plain-text description of the inquiry during user construction of the inquiry and before execution of the inquiry, and the natural language unit displaying the generated plain-text description in a progressive summary, in the graphical user interface, during user construction of the inquiry and before execution of the inquiry, the generated plain-text description being in natural language form and being different from graphical specification of the inquiry.

8. The computer apparatus as claimed in claim 7 wherein the natural language unit further continually updates the plain-text description in the progressive summary during user construction of the inquiry.

9. The computer apparatus as claimed in claim 7 wherein the plain-text description serves as a feedback loop to the user for reviewing construction of the inquiry.

10. The computer apparatus as claimed in claim 7 wherein the user input graphically specifying an inquiry is provided in a context of another model, and the ontology is common across models.

11. The computer apparatus as claimed in claim 10 wherein parts of the another model are incorporated into specification of the inquiry.

12. The computer apparatus as claimed in claim 7 wherein the streams of data have limited structure relative to databases and knowledgebases.

13. A computer system for graphical specification of inquiries, comprising:
   computer input means for posing an inquiry within context of a given model by receiving user input graphically specifying a query in a graphical user interface, the query monitoring streaming data, and the model graphically modeling entities and information including details of the inquiry;
   computer processor means for utilizing an ontology and a natural language template respective to type of inquiry in the model, the computer processor means generating a plain-text description of the query as translated from user graphical specification of the query during user construction of the query and before execution of the query, the generated plain-text description being in natural language form and being different from the user graphical specification of the query; and
   in the graphical user interface, computer output means for displaying the generated plain-text description during user construction of the query through the graphical user interface and outside of query execution.

14. The computer system of claim 13 wherein the computer processor means for generating continually updates the plain-text description during user construction of the query.

15. The computer system as claimed in claim 13 wherein the plain-text description serves as a feedback loop to the user for reviewing construction of the query.

16. The computer system as claimed in claim 13 wherein the computer input means for receiving operates in a context of another model in a manner enabling parts of the another model to be incorporated into specification of the query, and the ontology is common across models.

17. The computer system as claimed in claim 13 wherein the streaming data has limited structure relative to databases.

18. The computer system as claimed in claim 13 wherein the streaming data has limited structure relative to knowledgebases.

19. The computer system as claimed in claim 13 wherein the computer output means for displaying includes a progressive summary.

20. A computer program product comprising:
   a computer readable storage medium having a computer readable program for graphical specification of an inquiry, wherein the computer readable program when executed on a computer causes:
   receiving user input graphically specifying an inquiry in a graphical user interface, the inquiry being operateable on stream data and posed in context of a given model, the model graphically modeling entities and details of the inquiry;
   based on a predetermined ontology and on a natural language template for type of the inquiry in the model, generating a plain-text description of the inquiry during user construction of the inquiry and separate from execution of the inquiry, the plain-text description being in natural language form and being different from graphical specification of the inquiry; and
   in the graphical user interface, displaying the generated plain-text description in a progressive summary, said displaying being during user construction of the inquiry through the graphical user interface and separate from execution of the inquiry.

\* \* \* \* \*